J. HUTCHINSON.
CHANGEABLE INDICATOR.
APPLICATION FILED MAR. 2, 1910.
1,067,250.
Patented July 15, 1913.
6 SHEETS—SHEET 1.
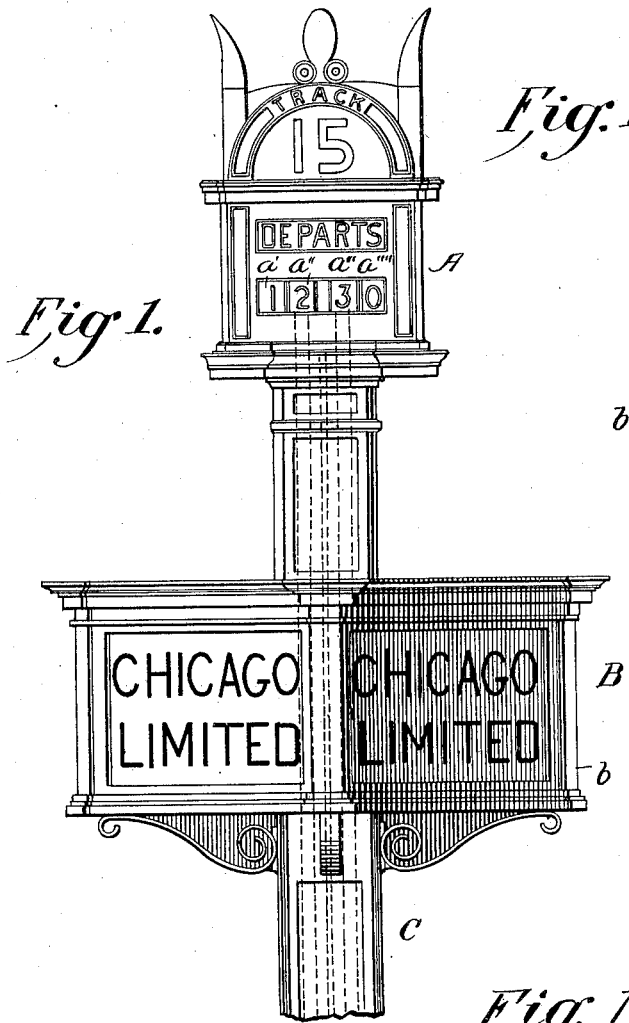
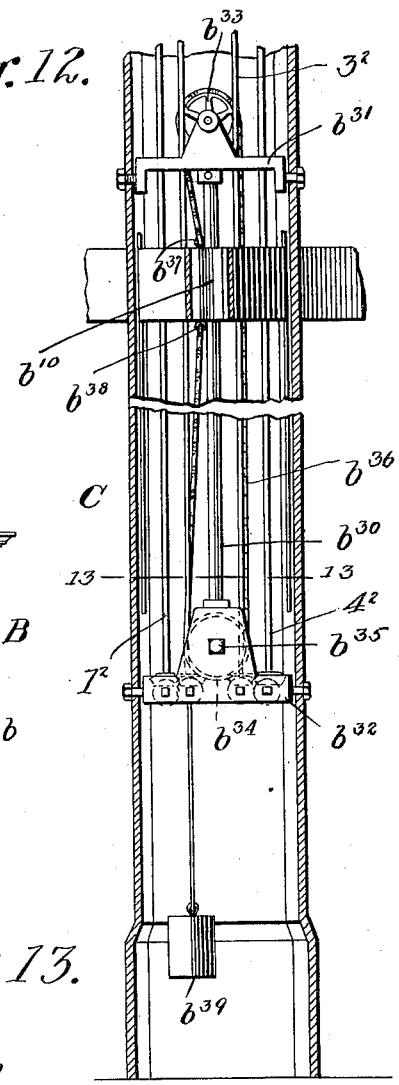
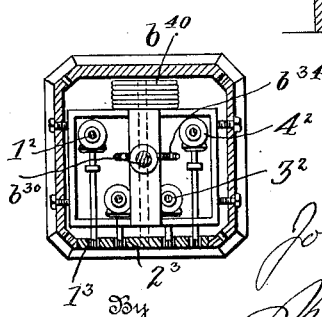

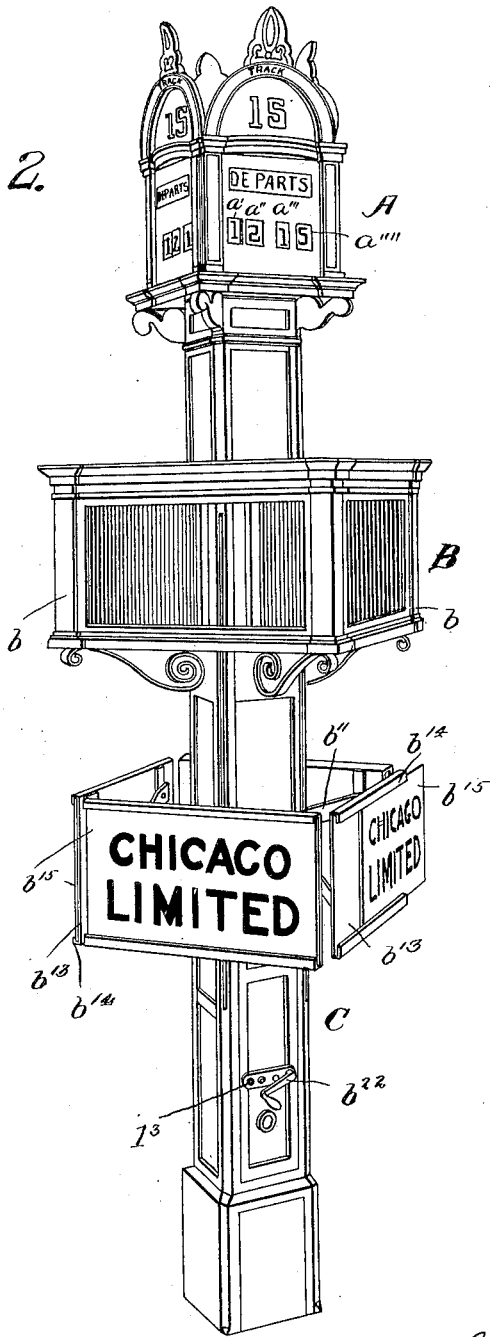

J. HUTCHINSON.
CHANGEABLE INDICATOR.
APPLICATION FILED MAR. 2, 1910.

1,067,250.

Patented July 15, 1913.
6 SHEETS—SHEET 3.

Witnesses
Inventor
Job Hutchinson,
By
Attorney

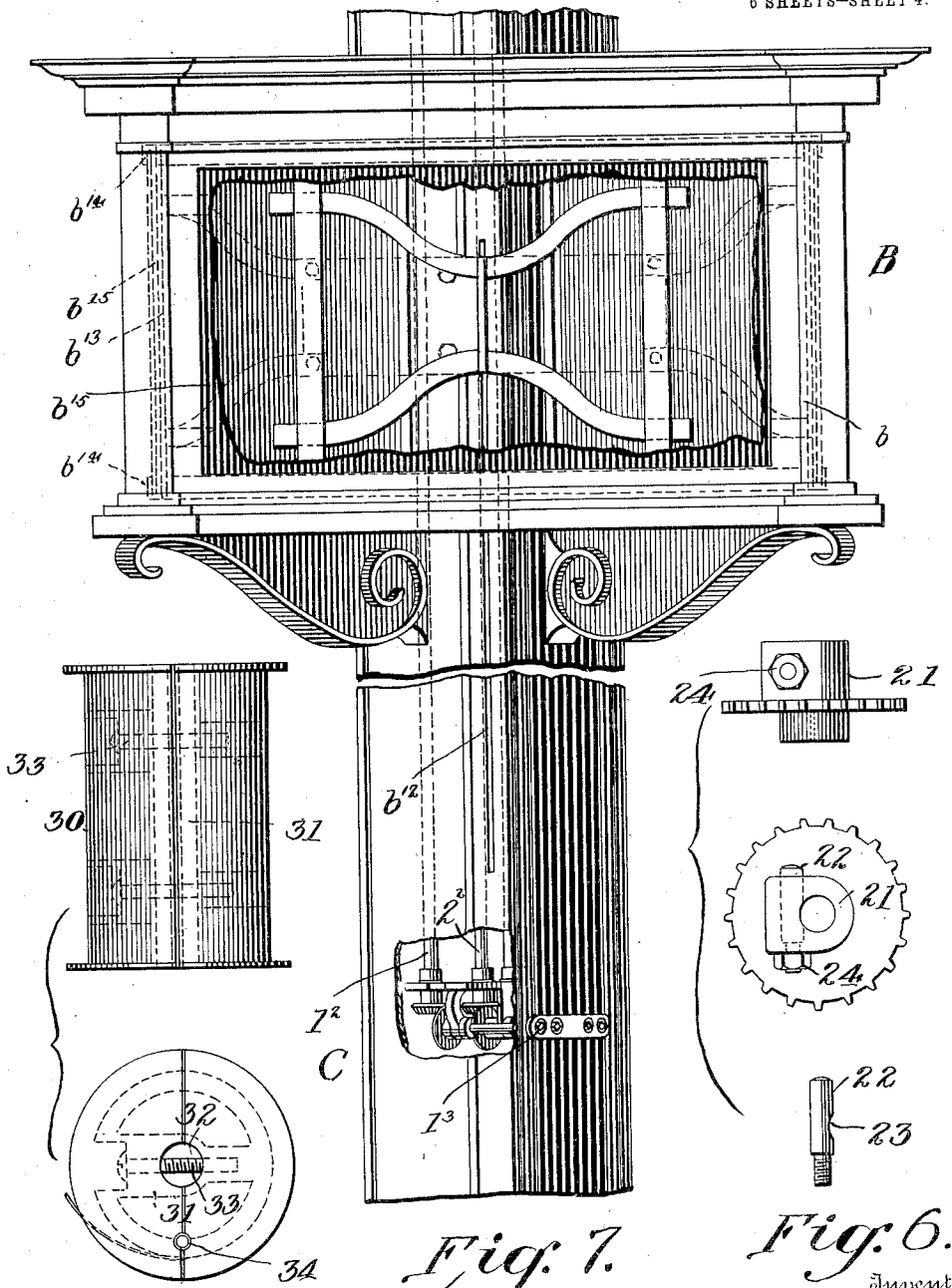

J. HUTCHINSON.
CHANGEABLE INDICATOR.
APPLICATION FILED MAR. 2, 1910.

1,067,250.

Patented July 15, 1913.
6 SHEETS—SHEET 5.

Witnesses

Inventor
Job Hutchinson,
By
Attorney

J. HUTCHINSON.
CHANGEABLE INDICATOR.
APPLICATION FILED MAR. 2, 1910.
1,067,250.
Patented July 15, 1913.
6 SHEETS—SHEET 6.
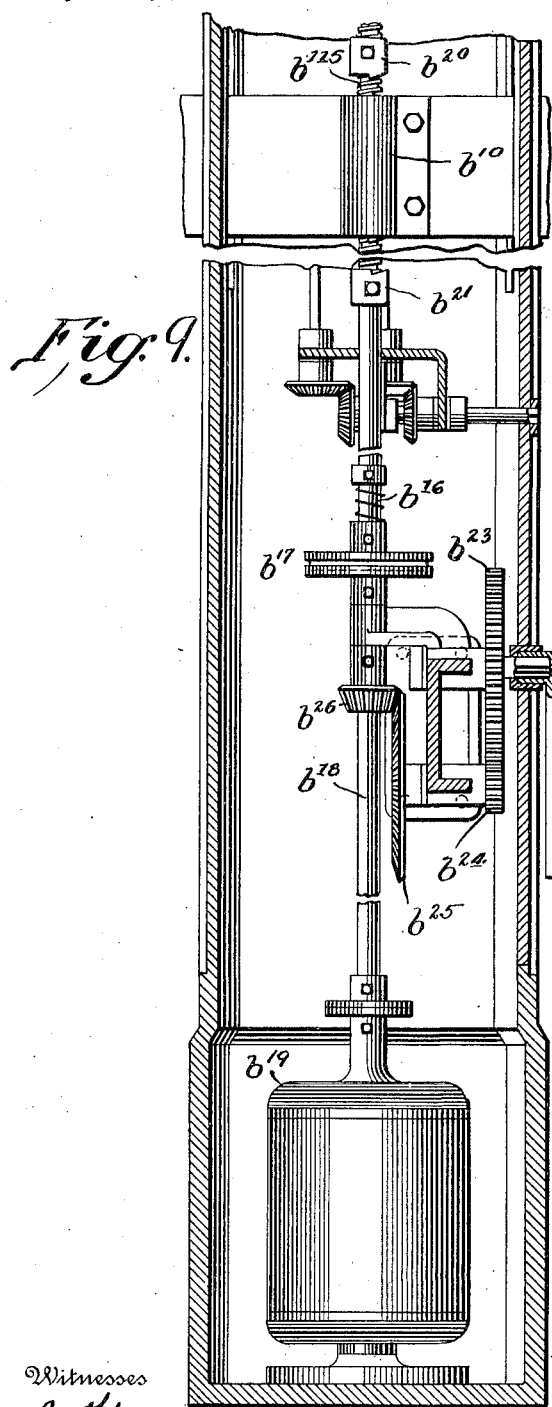
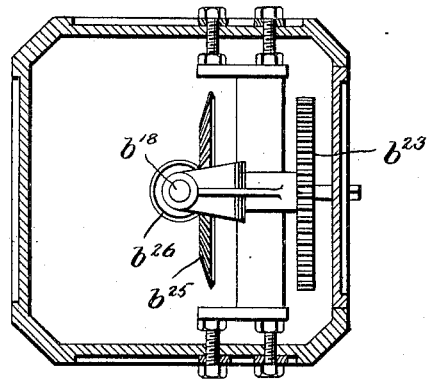
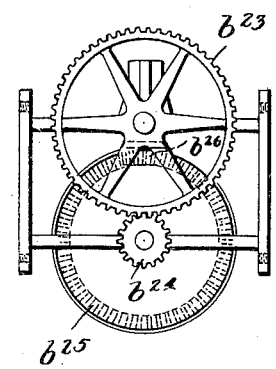

though a greater and less number of faces
UNITED STATES PATENT OFFICE.

JOB HUTCHINSON, OF NEW YORK, N. Y., ASSIGNOR TO NATIONAL INDICATOR COMPANY, A CORPORATION OF NEW YORK.

CHANGEABLE INDICATOR.

1,067,250.  Specification of Letters Patent.  Patented July 15, 1913.

Application filed March 2, 1910. Serial No. 546,899.

*To all whom it may concern:*

Be it known that I, JOB HUTCHINSON, a citizen of the United States, residing at New York, in the county and State of New York, have invented certain new and useful Improvements in Changeable Indicators, of which the following is a specification.

My invention relates to changeable indicators, in general, and more particularly to train departure indicators for railway depots.

The objects of the invention are to provide a self contained instrument which will show the name of the train and the time of departure from any direction in which the indicator may be viewed; to improve the construction of the time indicating and operating mechanism and the train-name card operating means; and in general to improve the details of construction of these machines.

In carrying the invention into effect I provide a standard of sufficient height to carry the train-name and the time indications the proper distance above the ground, and all operating connections are arranged near the base of the standard where they may be readily reached and manipulated by a person standing on the ground.

An indicator having four faces is shown, although a greater and less number of faces may be provided if desired or found expedient, and the time indication is changed simultaneously and correspondingly upon each of said faces. As the display position of the train-name cards is too high to be reached from the ground, means are provided for lowering and raising a rack carrying these cards, so that the latter may be quickly changed and returned to the display position; and such means comprise both manual and motor operated mechanism.

The invention consists in the novel combination of parts and features of construction hereinafter described and claimed, and shown in the accompanying drawings in which—

Figure 3:
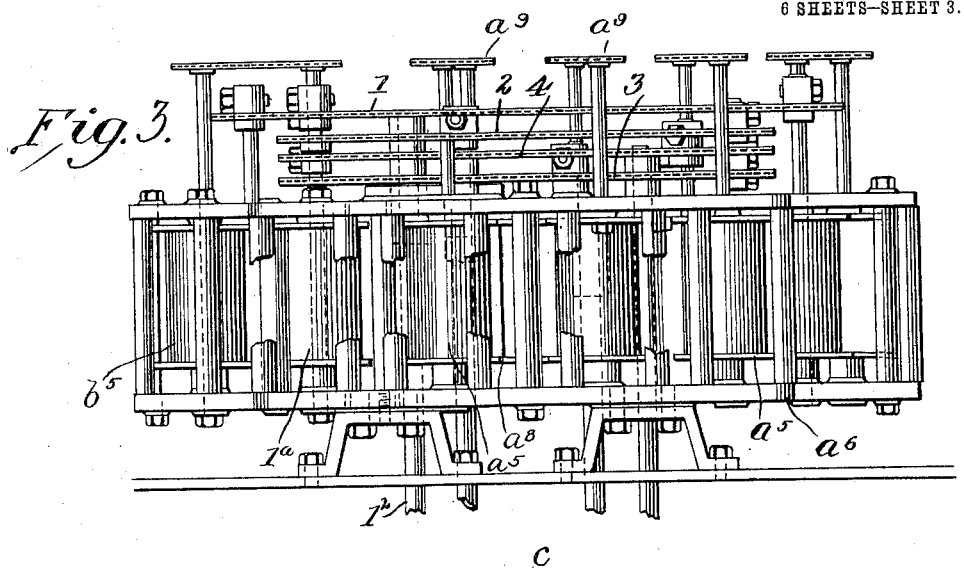
Figure 4:
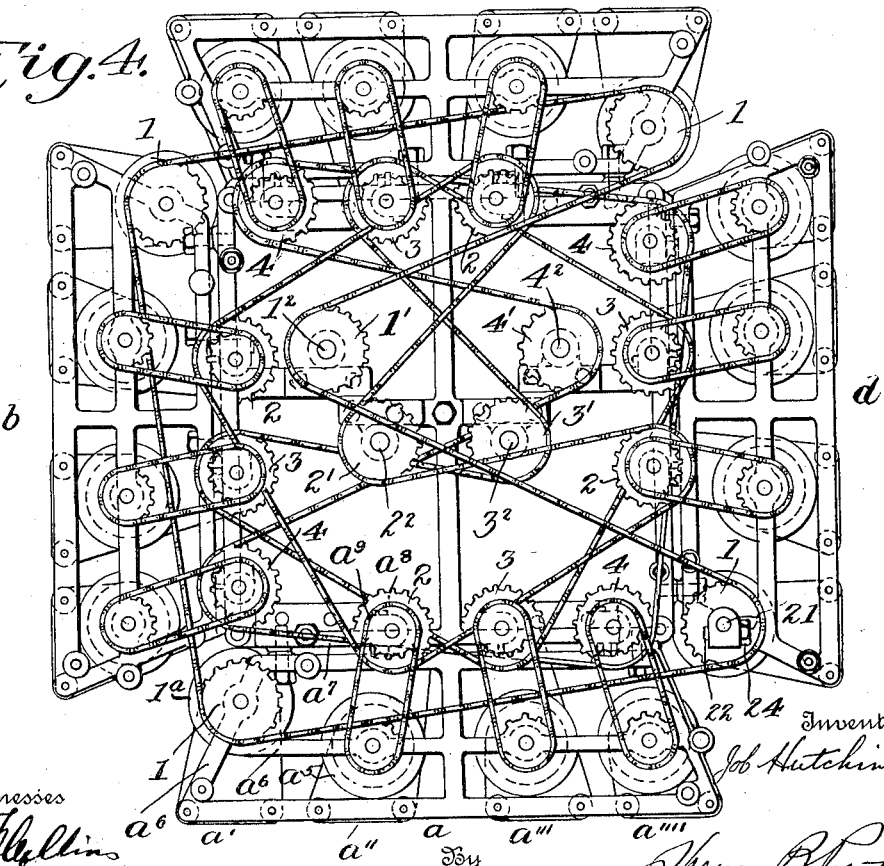
Figure 8:
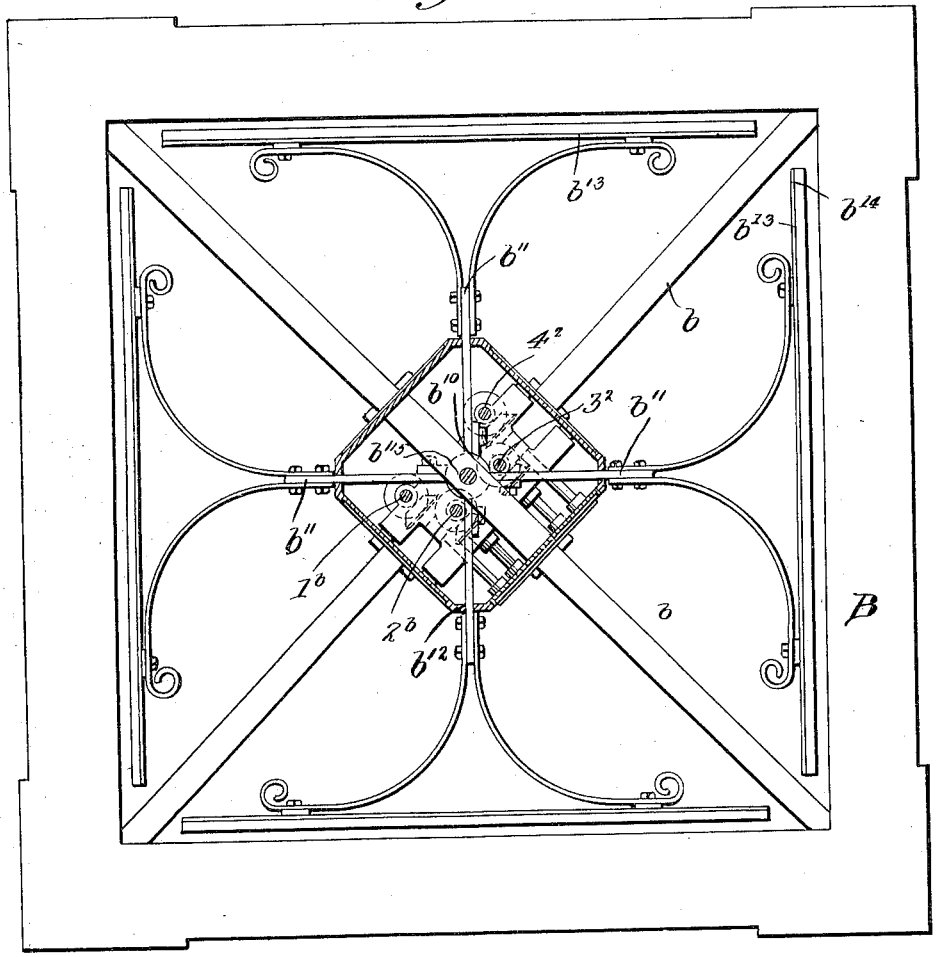
Figure 14:
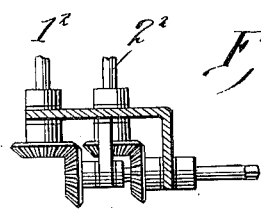

Figure 1 is a front view in elevation of the indicator complete; Fig. 2 is a side perspective view, the train-name rack being shown in the lowered position; Fig. 3 is an enlarged side view of the time web mechanism, the casing for the same having been removed; Fig. 4 is a plan view of the same; Fig. 5 is a detail of the reels for the time webs; Fig. 6 is a detail of the sprocket adjustment of certain of the time reels; Fig. 7 is an enlarged face view of the time operating and train-card operating arrangements; Fig. 8 is a plan view of the same; Fig. 9 is a detail of one method of operating the train-name card rack; Figs. 10 and 11 are details of parts of the same; Fig. 12 is a sectional view of the standard, showing another method of operating the train-name card rack; and Fig. 13 is a plan view of the same in section taken on line 13—13 of Fig. 12. Fig. 14 is a detail of the time web operating gears shown in Fig. 7.

Referring to the drawings, A designates the time indicating portion, and B the train-name portion, both mounted on standard C, which latter may be of any desired height. The indicator illustrated has four faces upon each of which the same indication appears.

The time indicating portion A comprises a plurality of sets of webs $a'$, $a''$, $a'''$, $a''''$, which are mounted on suitable reels. As the webs and reels of each set are similar, a description of one set, $a$, for instance, will suffice for all. Web $a'$, which carries only the numeral 1, need only be short and is shown as an endless web passing around reel $1^a$ and the idlers on the face of the indicator. Webs $a''$, $a'''$, and $a''''$ are longer and are mounted on pairs of reels. The outer reel $a^5$ is mounted in frame $a^6$, which frame is bolted or otherwise secured to the main frame $a^7$. The operating reel $a^8$ of this pair is mounted on frame $a^7$, and is operatively geared to reel $a^5$ by sprocket chain $a^9$ engaging sprockets on the spindles of these reels. The other pairs of reels, for webs $a'''$ and $a''''$ are similarly mounted and connected.

Reel $1^a$ has a driving sprocket 1, mounted in the same plane and on an extension of the spindle of said reel as the corresponding sprocket of the other sets, $b$, $c$ and $d$, and in this same plane is a driving sprocket $1'$ mounted on shaft $1^2$ which extends downwardly through the standard and is operated by a crank through opening $1^3$ in the casing. A sprocket chain passing around said sprocket wheels 1 of each set $a$, $b$, $c$, $d$, and also over sprocket $1'$, constituting a driving connection. Corresponding sprockets 2 of each set are also arranged in a common plane with drive sprocket 2', and these connected by a sprocket chain in a manner similar to that just described. The same is true of sprockets 3 and 4 of each set.

Sprockets 2, 3 and 4 are provided with a special adjustable clamping device for attachment to their respective spindles, as shown in Fig. 6, where it will be seen that a block 21, secured to or forming part of the sprocket wheel, is drilled to receive a key 22, notched at 23, and capable of being drawn tight by nut 24. By this means the time webs or bands may be brought to the proper positions initially and then the sprocket wheel clamped to the spindle in the adjusted position.

A preferred construction of the time reels is shown in Fig. 5, where it will be seen that the reel is formed in two longitudinal portions 30, each having a rib 31 channeled at 32 to fit the spindle. These portions are secured together and to said spindle by screws 33. The end of the web is attached at 34. The frame B is a box like structure mounted on standard C, and includes radial corner supports $b$, and the open panels one of which is provided for each face of the frame. The frame is preferably arranged angularly with respect to standard C, that is, with its corners opposite the faces of the standard. The train-name card rack or indication-supporting element consists of a spider or frame of metal having a central hub $b^{10}$ and four arms $b^{11}$ extending radially therefrom through slots $b^{12}$ in the corners of standard C. Each arm $b^{11}$ carries a card slide $b^{13}$ preferably arranged perpendicular thereto and having upper and lower channel irons $b^{14}$ to receive the card $b^{15}$. It will be seen by reference to Figs. 2 and 8 that the card slides of the respective faces do not meet at the corners, this arrangement permitting the ready insertion and removal of the cards and also permitting these racks to clear the supports or corner pieces $b$ of frame B when the card rack is moved up into the display position within said frame. In this position each card held in the rack will occupy one of the open panels of the frame.

Various means may be provided for operating the card rack. As shown in Figs. 1, 7 and 9, a screw shaft $b^{115}$ engages the hub $b^{10}$, which is threaded for the purpose. This shaft is connected by spring $b^{16}$ and friction coupling $b^{17}$ with shaft $b^{18}$ of electric motor $b^{19}$. End stops $b^{20}$ and $b^{21}$ are provided on shaft $b^{115}$ so that at the ends of travel of nut $b^{10}$ the screw shaft $b^{115}$ will be stopped and the motor will run idle against the friction coupling until cut out.

Instead of operating the shaft $b^{115}$ by means of the motor, I may employ a manual device shown in Fig. 9 as an auxiliary means including a crank $b^{22}$, and gears $b^{23}$, $b^{24}$, $b^{25}$, $b^{26}$. Or, I may and preferably do employ the arrangement shown in Figs. 12 and 13. In these figures screw shaft $b^{115}$ has been replaced by a guide shaft $b^{30}$ mounted within standard C on brackets $b^{31}$ and $b^{32}$. Hub $b^{10}$ is bored smooth to slide upon this guide shaft. On bracket $b^{31}$ is mounted an idle sprocket wheel $b^{33}$, and bracket $b^{32}$ carries a drive sprocket wheel $b^{34}$ operated by a crank through spindle $b^{35}$. A sprocket chain $b^{36}$ has its ends attached at $b^{37}$ and $b^{38}$ to hub $b^{10}$, and passes over sprocket wheels $b^{33}$ and $b^{34}$. The card rack may thus be operated positively in either direction. A counterweight $b^{39}$ is suspended from drum $b^{40}$ mounted on an extension of the driving sprocket spindle, as shown in Figs. 12 and 13. As will be readily understood, in either form of actuating mechanism employed, the hub is held to travel in a fixed axial path, the movement being either a sliding one with the guide shaft $b^{30}$ as the positioning element or is provided by the threaded connection with the shaft $b^{115}$ as the element positioning the hub against movement out of an axial path, thereby insuring that the card slides are in permanent position to properly pass into and out of the panels of the card rack, said guiding element preventing rocking of the indication-supporting element.

While I have described various embodiments and details as illustrated of my invention, I do not wish to be limited specifically to the exact combination and various details set forth, as I am aware that modifications and changes may be made, or some of the features used either alone or in other combinations, without departing from the spirit of the invention, and all such changes I aim to cover by and within the scope of the appended claims.

Having described my invention, what I claim as new, and desire to secure by Letters Patent of the United States, is—

1. An indicator comprising a standard vertically slotted, a display frame outside of and mounted upon the upper portion of said standard, an indication-supporting element having indication supports outside said standards and arms extending through the slots of said standard, and means within said standard operable from the lower portion thereof to raise said indication-supporting element to locate an indication in said display frame and lower said element to permit the removal of the indication.

2. An indicator comprising a standard having vertical slots, supporting brackets extending from the upper portion of said standard between said slots, a display frame mounted upon said supporting brackets outside of said standard, a spider within said standard having arms extending outwardly through said slots, an indication-supporting frame carried by each arm arranged to fit said display frame between said brackets when in raised position, said indication-supporting frames being spaced from each other so as to admit said brackets therebetween, and means for raising and lowering said spider.

3. An indicator comprising a standard having a plurality of faces angular with respect to each other and also having slots at the intersections of said faces, a display frame having a plurality of faces positioned without the face plane of the standard and adapted to provide exposure of indications, the planes of the faces of the indicating portion being angular with respect to the face planes of the standard, and means supported within and extending through the slots of the standard for moving an indication into and out of exposure position with respect to a face of the indicating portion.

4. A changeable indicator comprising a standard vertically slotted, a frame mounted outside of and upon said standard and having a plurality of open panel faces, a spider within and having arms extending outwardly through said slots and formed to receive indicating means, said indicating means being positioned to occupy the open panels of said faces, and means for raising and lowering said spider.

5. A changeable indicator comprising a standard, a spider having arms extending without said standard and formed to receive indicating means, said spider having a central perforated hub, a bracket mounted above said spider an idler pulley mounted on said bracket, a second bracket mounted below said spider and carrying an operating pulley, a guide rod extending between said brackets upon which said hub slides, and a flexible connection coöperating with said spider and pulleys to raise and lower said spider.

In testimony whereof, I have affixed my signature in the presence of two subscribing witnesses.

JOB HUTCHINSON.

Witnesses:
OLIVER R. GRANT,
SPENCER B. PRENTISS.

Copies of this patent may be obtained for five cents each, by addressing the "Commissioner of Patents, Washington, D. C."